US012149454B2

(12) United States Patent
Battersby et al.

(10) Patent No.: US 12,149,454 B2
(45) Date of Patent: Nov. 19, 2024

(54) VIRTUAL COMPUTING SERVICES DEPLOYMENT NETWORK

(71) Applicant: VMware, Inc., Palo Alto, CA (US)

(72) Inventors: Clinton B. Battersby, Norwood, MA (US); Kenneth Ringdahl, Pelham, NH (US); James Snow, Hanover, NH (US); Paul J. Gaffney, Southborough, MA (US); Andrew W. Hobgood, Grantham, NH (US)

(73) Assignee: Omnissa, LLC, Mountain View, CA (US)

( * ) Notice: Subject to any disclaimer, the term of this patent is extended or adjusted under 35 U.S.C. 154(b) by 40 days.

(21) Appl. No.: 17/466,506

(22) Filed: Sep. 3, 2021

(65) Prior Publication Data

US 2021/0399996 A1    Dec. 23, 2021

Related U.S. Application Data

(63) Continuation of application No. 16/057,303, filed on Aug. 7, 2018, now Pat. No. 11,121,982, which is a
(Continued)

(51) Int. Cl.
*H04L 47/70* (2022.01)
*G06F 9/50* (2006.01)
(Continued)

(52) U.S. Cl.
CPC ............ *H04L 47/82* (2013.01); *G06F 9/5044* (2013.01); *H04L 47/70* (2013.01); *H04L 67/141* (2013.01); *H04L 67/306* (2013.01)

(58) Field of Classification Search
CPC ......... H04L 47/70; H04L 47/82; H04L 67/10; H04L 67/141; H04L 67/306; G06F 9/5044
See application file for complete search history.

(56) References Cited

U.S. PATENT DOCUMENTS 6,167,438 A * 12/2000 Yates .................. H04L 67/1001
                                                                709/216
6,226,684 B1    5/2001 Sung
(Continued)

OTHER PUBLICATIONS

Kupczyk, Mirosław, et al. "The migrating desktop as a gui framework for the "applications on demand" concept." International Conference on Computational Science. Springer, Berlin, Heidelberg. (Year: 2004).*

(Continued)

*Primary Examiner* — John M Macilwinen
(74) *Attorney, Agent, or Firm* — Kim & Stewart LLP

(57) ABSTRACT

A virtual computing services deployment network provides a consistent user experience from a variety of locations via a connection fabric for accessing a virtual desktop. The connection fabric identifies a user profile defining the virtualized desktop resources required for a particular user. The connection fabric includes distributed data and processing in nodes distributed throughout a public access network accessible from a user access device. Each of the fabric nodes is operable to provide an identifier (such as an IP address) of a computing resource adapted to provide the user specific desktop. A user access device accesses a local fabric node in the connection fabric, and the fabric node determines a computing resource matching a user profile of expected computing resources. The fabric node associates the user access device with the computing resource and sends the user access device an identifier for directly accessing the computing resource.

21 Claims, 7 Drawing Sheets

Related U.S. Application Data continuation of application No. 15/390,185, filed on Dec. 23, 2016, now Pat. No. 10,057,189, which is a continuation of application No. 14/287,404, filed on May 27, 2014, now Pat. No. 9,531,638, which is a continuation of application No. 13/219,735, filed on Aug. 29, 2011, now Pat. No. 8,745,236, which is a continuation of application No. 12/348,517, filed on Jan. 5, 2009, now Pat. No. 8,010,676.

(60) Provisional application No. 61/018,753, filed on Jan. 3, 2008.

(51) Int. Cl.
*H04L 67/141* (2022.01)
*H04L 67/306* (2022.01)

(56) References Cited

U.S. PATENT DOCUMENTS

| | | | |
|---|---|---|---|
| 6,317,775 | B1 | 11/2001 | Coile |
| 7,203,742 | B1 | 4/2007 | Luft |
| 7,340,522 | B1* | 3/2008 | Basu .................... G06F 9/5077 709/225 |
| 7,363,363 | B2 | 4/2008 | Dal Canto |
| 8,010,676 | B1 | 8/2011 | Battersby et al. |
| 8,725,886 | B1 | 5/2014 | Pulier et al. |
| 8,745,236 | B2 | 6/2014 | Battersby et al. |
| 9,531,638 | B2 | 12/2016 | Battersby et al. |
| 10,057,189 | B2 | 8/2018 | Battersby et al. |
| 11,121,982 | B2 | 9/2021 | Battersby et al. |
| 2002/0091798 | A1* | 7/2002 | Joshi .................... H04L 67/02 707/E17.112 |
| 2003/0037113 | A1 | 2/2003 | Petrovykh |
| 2003/0084165 | A1 | 5/2003 | Kjellberg |
| 2004/0167980 | A1 | 8/2004 | Doyle |
| 2004/0215590 | A1 | 10/2004 | Kroening |
| 2005/0131993 | A1* | 6/2005 | Fatula .................... G06F 9/5072 709/202 |
| 2005/0198303 | A1* | 9/2005 | Knauerhase .......... G06F 9/5055 709/227 |
| 2006/0191020 | A1 | 8/2006 | Miller |
| 2006/0294238 | A1 | 12/2006 | Naik |
| 2007/0240161 | A1 | 10/2007 | Prabhakar |
| 2008/0034408 | A1 | 2/2008 | Duggal |
| 2008/0059474 | A1 | 3/2008 | Lim |
| 2008/0221856 | A1 | 9/2008 | Dubnicki |
| 2009/0006537 | A1 | 1/2009 | Palekar |
| 2009/0265467 | A1 | 10/2009 | Peles |
| 2010/0114531 | A1 | 5/2010 | Korn |

OTHER PUBLICATIONS

Baratto, Ricardo A., et al. "Mobidesk: mobile virtual desktop computing." Proceedings of the 10th annual international conference on Mobile computing and networking. (Year: 2004).*

Averitt, Sam, et al. "Virtual computing laboratory (VCL)." Proceedings of the International Conference on the Virtual Computing Initiative. (Year: 2007).*

Yu, Wei, Sriram Chellappan, and Dong Xuan. "P2P/Grid-based overlay architecture to support VoIP services in large-scale IP networks." Future Generation Computer Systems 21.1: 209-219. (Year: 2005).*

Aliosio, Giovanni et al. Dynamic Grid Catalog Information Service. Across Grids 2003. LNCS 2970, pp. 198-205, 2004.

Baratto et al. "MobiDesk: Mobile Virtual Desktop Computing". MobiCom'04. Sep. 26-Oct. 1, 2004. pp. 1-15.

Buyya, R. and Venugopal, S. "A General Introduction to Grid Computing and Technologies"—Computer Society of India. pp. 9-15. Jul. 2005.

Notice of Allowability in U.S. Patent Appl. U.S. Appl. No. 12/348,517, mailed May 12, 2011.

Notice of Allowability in U.S. Patent Appl. U.S. Appl. No. 13/219,735, mailed Jan. 14, 2014.

Office Action in U.S. Patent Appl. U.S. Appl. No. 12/348,517, mailed Oct. 26, 2010.

Office Action in U.S. Patent Appl. U.S. Appl. No. 13/219,735, mailed Apr. 1, 2013.

Schmidt, B. et al. "The interactive performance of SLIM: a stateless, thin-client architecture." ACM, pp. 32-47, 1999.

Sotomayor, Borja. The Globus Toolkit 4 Programmer's Tutorial. University of Chicago. http://web.archive.org/web/20061016214040/gdp.globus.org/gt4-tutorial/multiplehtml/index.html. 2005.

* cited by examiner

VIRTUAL COMPUTING SERVICES DEPLOYMENT NETWORK

CROSS-REFERENCE TO RELATED APPLICATIONS

This application is a continuation of U.S. patent application Ser. No. 16/057,303, filed Aug. 7, 2018, which is a continuation of U.S. patent application Ser. No. 15/390,185, filed Dec. 23, 2016, which is a continuation of U.S. patent application Ser. No. 14/287,404, filed May 27, 2014, and issued as U.S. Pat. No. 9,531,638, which is a continuation of U.S. patent application Ser. No. 13/219,735, filed Aug. 29, 2011, and issued as U.S. Pat. No. 8,745,236, which is a continuation of U.S. patent application Ser. No. 12/348,517, filed Jan. 5, 2009, and issued as U.S. Pat. No. 8,010,676, which claims the benefit of U.S. Provisional Patent Application No. 61/018,753, filed Jan. 3, 2008, the disclosures of which are hereby incorporated by reference.

BACKGROUND

Modern enterprises expend substantial capital to maintain an IT infrastructure. A significant percentage of the expenditure stems from equipping individual users with dedicated computing resources in the form of desktop computers. There is a nearly universal mandate in corporations, governments and academic institutions to better control the escalating costs and complexity of managing desktops in large numbers and across widely disparate geographies. In addition, most companies continue to deploy traditional physical desktop computers running at less than 10% capacity, resulting in enormous waste of time, money and energy. In the computer realm, there is a continuing shift from initial deployment costs to ongoing maintenance costs. Traditionally, a computing infrastructure was marked with substantial up-front costs due to the high cost of computing hardware and memory resources. However, with the ongoing trend of reduced costs for computing hardware, and the converse trend of increased compensation for skilled personnel to support and maintain computer systems, a typical enterprise spends more to maintain a user than the cost to initially outfit the user.

Consistent with this view of reducing IT infrastructure costs, a provisioning approach that selectively provides users with only the computer services they need for a predetermined interval is more cost effective than outfitting each user with a largely idle PC. Early computing environments implemented a "mainframe" computing approach that allowed user access to the mainframe from a terminal device that performed only input and output. A multiprogramming operating system on the mainframe performed rapid context switching between a multitude of users to give each user the impression that the mainframe computer was dedicated to that user. Each user shared the memory, disk storage, and CPU capabilities for usage of the installed applications, giving each user a similar user experience. The mainframe was generally accessed from local terminals via a so-called "front end", or via telecommunications lines that were specific to a facility or dedicated POTS (plain old telephone service) voice lines, thus consuming expensive dedicated lines (i.e. not packet switched) for each remote user.

The modern equivalent of this is often referred to as Thin Client computing as opposed to the more conventional deployment of thick clients that have CPU, memory and storage and execute all of the software locally.

SUMMARY

Conventional desktop computing provisioning typically involves equipping each user with a dedicated CPU and storage device, such as a PC, and interconnecting each of the users via various networking approaches, depending on factors such as distance, speed, and number of users. Such approaches deploy a fixed set of CPU, memory, disk and application resources for usage by each particular user, and employ the network generally for transfer of files and access to shared devices like printers. Unfortunately, the above conventional approach suffers from several shortcomings. The dedicated resources, typically in a PC, result in a substantial percentage of unused CPU cycles, underutilized memory, and vacant disk space, none of which are available for use by another user when idle. Further, application licensing practices often encourage overprovisioning through so-called "seat license" provisions which require a license for each individual user (seat) regardless of how often that user actually invokes the application.

Conventional approaches may employ computer networks for transferring data, however still employ local processing (CPU) power that almost always results in user overprovisioning. While modern computer networks interconnect access gateways, processing devices, and data storage in a manner that allows a set of users to access resources, each individual user still requires a substantial outlay of hardware, software and administration to provision and maintain each thick client. There is a modern trend toward providing user access to computing resources from a variety of locations. Typically, such approaches attempt to emulate a consistent user experience from the variety of locations. Mechanisms such as virtual private networks (VPNs), web servers, and remote access applications are typically employed to provide an expected set of applications and data to a user at various locations. However, such approaches suffer from the shortcoming that the user experience is merely emulated at a remote location, and does not truly provision the user with the same set of resources regardless of location. It would be beneficial to provide a system and method for provisioning a user with a computing "desktop" that provides a consistent user experience via the same user profile indicative of the user's expected computing resources from a variety of network locations.

An alternate approach is to centralize the computing resources and connect users via a terminal device (thin client) that handles only the I/O and display capabilities for interacting with the centralized computing facility. In this model, computing resources are shared with a number of other users, and each user has access to the operating system and applications enabled at the centralized computing facility. Recent advances in server virtualization make it feasible to share the memory and CPU of a powerful server to run multiple operating systems and applications at the same time. The existing, centralized computing models based on virtualized computing typically employ a connection broker—a mechanism for associating a user to the desired session hosted in a centralized computing facility. However, conventional connection brokers suffer from the shortcomings that they do not scale well and performance tends to decline with large or geographically disperse networks. Identification of a particular user from among a large number of users may require extensive queries and network exchanges to identify a corresponding user profile. This is because existing connection brokers depend on relational databases and replication that are expensive and complex to scale to multiple datacenters across multiple geographies.

Existing connection brokers have typically been deployed in tandem with virtual computing environments as a means of associating users with virtual computing resources. The virtual computing resources, are typically virtual computing hardware and software residing in a data center computing facility that is leased or owned for such hosting. Such virtual computing resources may reside on a variety of geographically isolated computing facilities, typically as instantiated objects and/or hypervisor driven components or elements. As a result of these isolated deployments or computing silos, it is often problematic to reliably identify and associate each of the virtual computing elements with users requesting such resources.

Configurations herein substantially overcome such shortcomings by providing a consistent user experience from a variety of locations via a connection fabric for accessing a virtual desktop. The connection fabric identifies a user profile defining the virtualized desktop resources required for a particular user. The connection fabric includes multiple fabric nodes distributed throughout a public access network accessible from a user access device. Each of the fabric nodes is operable to provide an identifier (such as an IP address) of a computing resource adapted to provide the user specific virtual desktop. A user access device accesses a fabric node in the connection fabric, and the fabric node determines a computing resource matching a user profile of expected computing resources. The fabric node authenticates the user and sends the user access device an identifier for directly accessing the computing resource. The determined computing resource may be determined by a centralized virtual computing approach, such as that disclosed in copending U.S. patent application Ser. No. 11/875,297, filed Oct. 19, 2007, entitled PROVISIONED VIRTUAL COMPUTING, incorporated herein by reference, that allows access to computing services on selection matched computing devices for a variety of users.

The connection fabric, or access fabric, disclosed further below provides a distributed data repository and associated programs to a group of users by a system including a plurality of user access devices, such that each user access device is operable for accessing the connection fabric via a user access point on a grid network defining the access fabric, in which the grid network includes a plurality of interconnected fabric nodes. The access fabric includes a distributed data repository, including an encrypted association of users to computing elements, that eliminates the need for replicated databases, such that the associated computing elements have resources corresponding to the virtualized desktop resources required to satisfy the request. The fabric node computes an identity and network location of a corresponding computing element and transmits the identity and network location to the user access point. The user access point therefore defines a computing endpoint operable to access the computing services at the corresponding computing element.

Therefore, the connection fabric is responsive to a geographically disperse user population, allowing connection from an arbitrary network location, and matching the user with an appropriate virtual computing element, or computing resource. The connection fabric, or more particularly any particular fabric node receiving the user request, need operate only to return a resource identifier of an appropriate computing facility to the requesting user. Such an identifier enables subsequent, fabric-independent communications between the user and the selected virtual computing element. In an example arrangement, the identifier may be a suitable network location, such as an IP address and a port, however may take other forms as well. The connection fabric is not an intermediary to the subsequent communication between the user and the virtual computing element. Thus, the actual network location of the fabric node does not affect subsequent computing resource usage. Each of the fabric nodes maintains network location independence by employing a portion of overall user profile data, and maintains a distributed cache of selectively replicated data to manage the connection requests. The connection fabric therefore remains independent from the virtual computing elements with which it connects users. Thus, each fabric node maintains a partial set of user profile information such that it is employed in a distributed and partially replicated form as determined by usage patterns and load.

The connection fabric embraces four features in particular: The connection fabric need not be associated with any particular data center of physical location. The connection fabric nodes share the same replicated data so a connection can be instantiated from any connection fabric node. Any user may connect to any virtual desktop from a remote network location, thus there is no need for computing silos and no split horizon integrity issues.

The connection fabric scales independent of the computing resources it proscribes, which allows the connection fabric to expand and contract based on demand to provide the highest level of service at the lowest possible cost. Scaling requirements for the connection fabric (where users access the connection fabric for a few seconds) are fundamentally different from the scaling of the virtualized desktop computing where a user is connected for hours at a time. In contrast to conventional connection brokers, connection fabric nodes are readily deployable to meet demands, as each connection fabric node is responsive to any user. In contrast, conventional fabric nodes require substantial deployment efforts to instantiate.

For example, during peak connection periods, additional connection fabric nodes can be added to address the peak demand and maintain a high level of service. During non-peak periods, a smaller number of connection fabric nodes can be used to lower operating costs.

The connection fabric is not tied to a particular remoting protocol and can be used to connect end point devices over RDP, ICA and other emerging remoting protocols. (Spice, Net2Display etc.)

Further, no sensitive information is stored in the connection fabric. User names are stored as hashes and no password or other sensitive information is stored in the replicated data fabric.

In further detail, the system and methods defined herein employs the connection fabric for identifying available computing services to users by receiving a connection request from a user via the user access point, in which the user has a user profile indicative of expected computing resources, and accesses the connection fabric including a plurality of fabric nodes, such that the fabric nodes are collectively responsive to the user for determining a computing resource according to the user profile. Each of the fabric nodes is independent of a location in the connection fabric, typically deployed on a private or public access network such as the Internet, and each is adapted to communicate with other fabric nodes for determining the computing resource best matching the user's expected computing resources. The method identifies, from a particular fabric node, a computing resource operable to provide the expected computing resources according to the user profile, retrieves, from a mapping of computing resources to applications, a network location of the identified computing resource, and associates the user with the identified computing resource by maintaining an association table of users, organizations, and computing resource. The fabric node then transmits the identity of the identified computing resource to the user access point, such that the transmitted identity (typically an IP address) enables the user access point to access the identified computing resource.

Alternate configurations of the invention include a multiprogramming or multiprocessing computerized device such as a workstation, handheld or laptop computer, smartphone, or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such configuration comprises a computer program product that has a computer-readable storage medium including computer program logic encoded thereon that, when performed in a multiprocessing computerized device having a coupling of a memory, a processor and a storage medium, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Conventional computing environments tend to overprovision or underprovision a user by inadequate matching of users to available computing resources. Such localized computing resources are further compounded by inadequate or erratic remote access mechanisms, leading to inconsistent user experiences. A connection fabric providing computing services as discussed below provides a consistent user experience from a variety of remote locations via the connection fabric for accessing a virtual desktop. The connection fabric identifies a user profile defining the desktop that provides the user experience, including defining the operating system and applications employed by the user. The connection fabric includes fabric nodes distributed throughout a public access network accessible from a user access device. Each of the fabric nodes is operable to provide an identifier (such as an IP address) of a computing resource adapted to provide the user specific desktop. A user access device accesses a local fabric node in the connection fabric via the user access point or other suitable coupling, and the fabric node determines a computing resource matching a user profile of expected computing resources. The fabric node associates the user access device with the computing resource and sends the user access device an identifier for directly accessing the matched computing resource.

Figure 1:
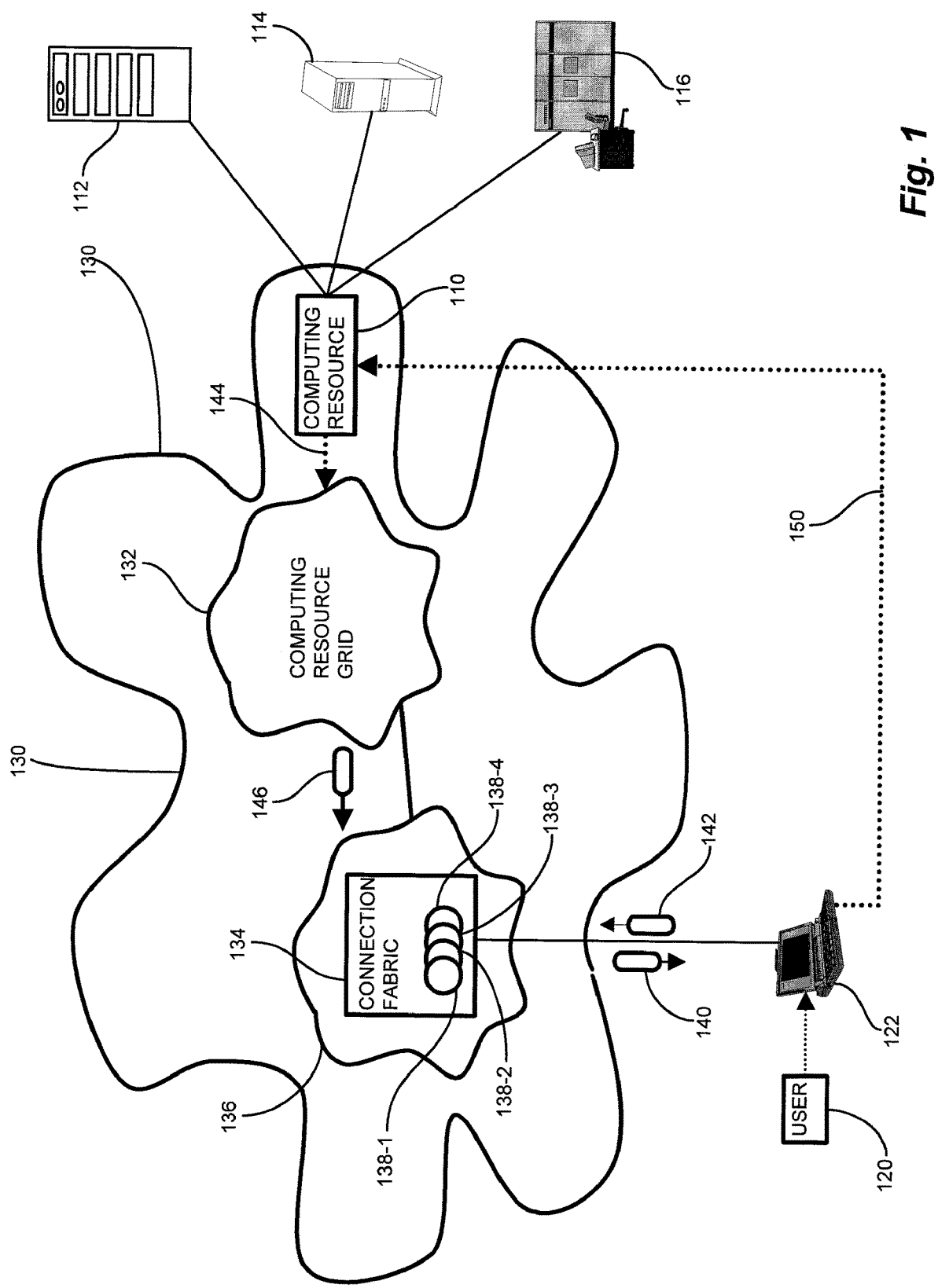
FIG. 1 is a context diagram of an exemplary computing environment employing a connection fabric.

FIG. 1 is a context diagram of an exemplary computing environment employing the connection fabric. Referring to FIG. 1, the computing environment 100 is operable to provide a computing resource 110 to the user 120. The user 120 typically employs a user access point 122, or device, operable for input/output (I/O) exchange (i.e. at least a keyboard and display device). The computing resource 110 may be a processing device accessible via a public access network 130 such as the Internet, and is matched to the needs of the user 122 by mechanisms discussed in further detail below. Briefly, the computing resource may be a computing element 112 servicing multiple users, such as that described in the copending U.S. patent application cited above, a deducted server 114 servicing the user exclusively, or a grid service 116 apportioning high volume computing resources. A computing resource grid 132 included in the network 130 interconnects a plurality of computing resources 110 for matching with users 120 depending on computing needs, also discussed further below. A connection fabric 134, also included in the network 130 is accessible by the user access device 122 for providing the identity 140 of a suitable computing resource 110 to the user access device 122.

In operation, the connection fabric 134 receives a request 142 from a user access device (user device) 122 to provide computing services. The connection fabric 134, taking the form of a network interconnection 136 of fabric nodes 138-1..138-4 (138 generally) in the example arrangement shown, receives the request 142. The connection fabric 134 identifies a network location 144 of a computing resource 110 determined to be responsive to the needs of the user 120. The fabric nodes 138 form a distributed set that scales horizontally as needed, as resources permit. This provides separation of virtualized compute capacity and management (Element) from the connection logic contained in the connection fabric. A connection policy stored in the connection fabric 134 connects the user access device 122 to an appropriate computing resource 110. Since the interrelated fabric nodes 138 that define the connection fabric 134 are each self-contained, the number of instantiated fabric nodes 138 throttles up and down with demand. Thus, the fabric nodes are self maintaining and intrinsically fault tolerant, since each may spawn addition fabric nodes 138 as connection requests 142 and computing demands require.

The computing resource grid 132 passes a resource identity 146 of the computing resource 110, such as an IP address, to the connection fabric. The connection fabric 134 associates the user device 122 with the computing resource 110, and sends the user device 122 an identity (ID) 140 of the computing resource 110. Using the sent ID 140, the user device 122 accesses a connection 150 to the computing resource 110 for carrying on the computing needs of the user 120. Note that the computing resource grid 132 and fabric node interconnection 136 need not and typically are not distinct networks, but rather part of the public access network 136 and/or intranet upon which the invention operates. While shown distinct for illustration purposes, actual implementation may likely overlap such networks and the fabric nodes may even execute co-located with the computing resources 110.

In the example configuration disclosed, the user access device 122 need not employ local state information such as that used for processing or computing, and interacts via only I/O with the computing resource 110. Such an arrangement provides for minimal cost and deployment complexities on behalf of the user device 122. Alternatively, the user device 122 may be a more robust device, however employs only network 130 communication capability for employing the connection 150 to the computing resources 110. In this manner, the computing resources provided to the user 120 via the connection fabric 134 remain independent of the location of the user device 122, such that the user 120 accesses the same or similar computing resource 110 in response to each request 142, as determined by the connection fabric 134.

Figure 2:
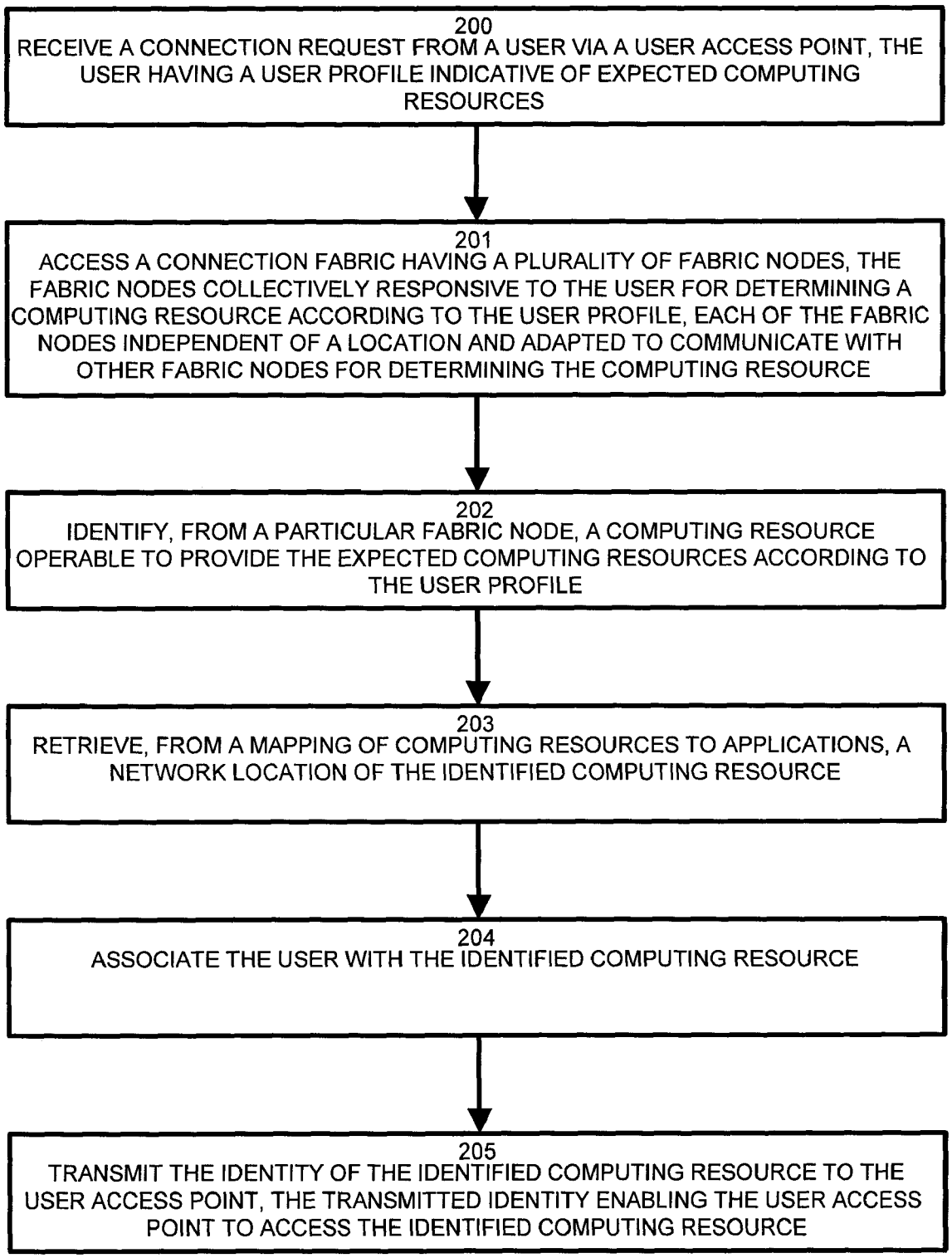
FIG. 2 is a flowchart of connection fabric operation in the computing environment of FIG. 1.

FIG. 2 is a flowchart of connection fabric operation in the computing environment of FIG. 1. Referring to FIGS. 1 and 2, at step 200, the method of providing computing services to users 120 as disclosed herein includes receiving a connection request 142 from a user 120 via a user access point such as a user device 122, in which the user has a user profile (162, FIG. 3) indicative of expected computing resources. The expected computing resources pertain to items such as memory, applications, CPU requirements (i.e. processing power) and response time, and may include other parameters. The user device 122 accesses a connection fabric 134 having a plurality of fabric nodes 138, such that the fabric nodes 138 are collectively responsive to the user device 122 for determining a computing resource 110 according to the user profile 162, as depicted at step 201. Each of the fabric nodes 138 is independent of a location and is adapted to communicate with other fabric nodes 138 for determining the computing resource 110. Thus, the fabric nodes 138 distributed across the interconnection 136 collectively define the connection fabric 138.

Based on the request 142, the connection fabric 134 identifies, from a particular fabric node 138, a computing resource 110 operable to provide the expected computing resources according to the user profile 162, as depicted at step 202. Based on a correlation of the user profile and available computing resources, discussed further below, the connection fabric 134 retrieves, from a mapping of computing resources 110 to applications, a network location of the identified computing resource 110 that is best or well suited to the user 120, as shown at step 203. The connection fabric 134 associates the user 120 with the identified computing resource 110 by designating the match in a table or other repository for future reference, as disclosed at step 204. Matching the user with a resource element may employ a distributed hash table (DHT) or other suitable mapping. The distributed hash table is nondescript of the resource element servicing a particular user such that network sniffing or inspection will not reveal the identity of a user or the computing element to which the user is assigned. Further, the DHT is operable for associating a user with any one of the resource elements in the connection fabric 134. The connection fabric 134 then transmits the identity, such as an IP address, of the identified computing resource 110 to the user access device 122, such that the transmitted identity 140 enables the user access point 122 to access the identified computing resource 110 via the connection 150, as depicted at step 205.

Figure 3:
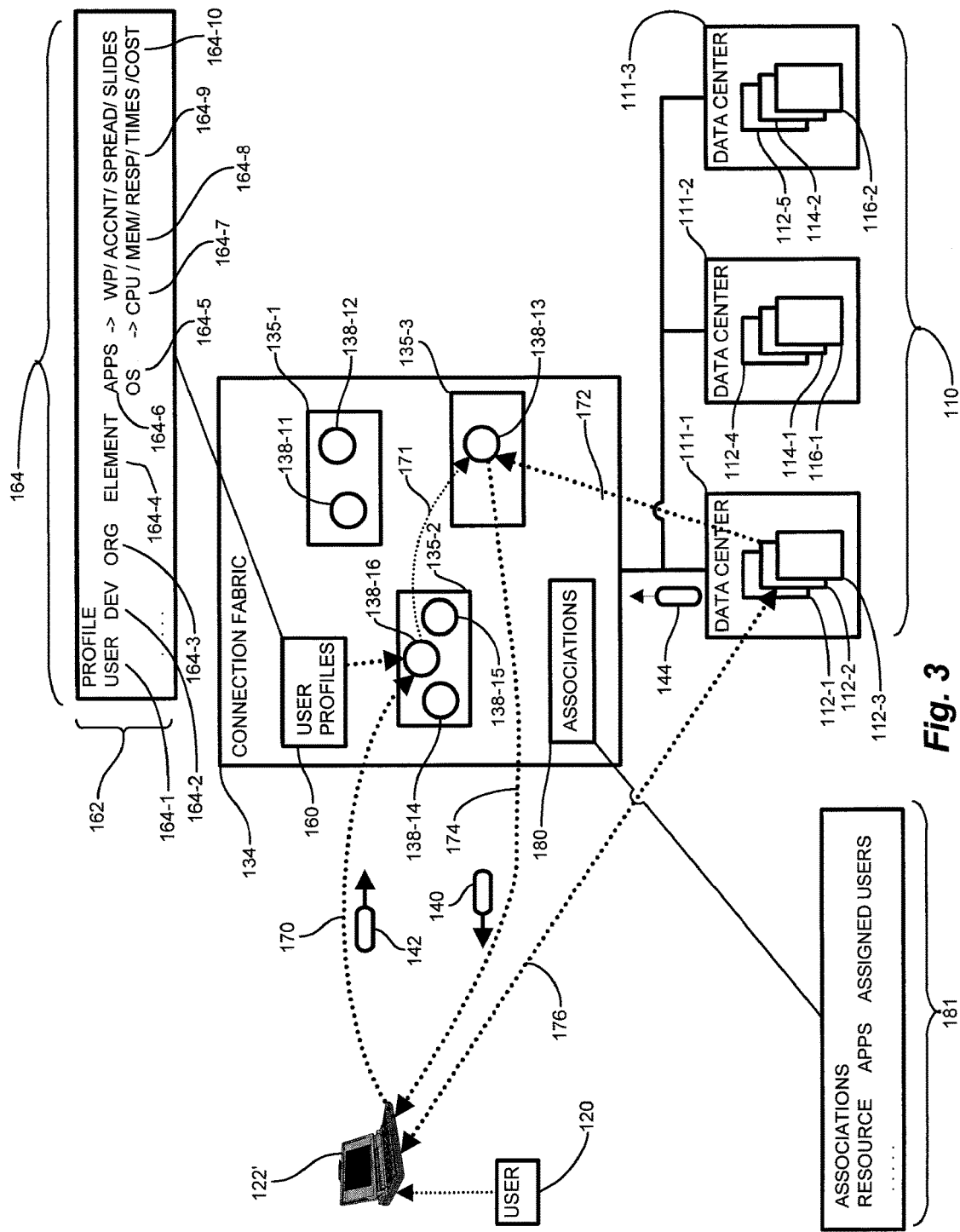
FIG. 3 is a block diagram of a connection fabric configuration suitable for use with the present invention.
Figure 4:
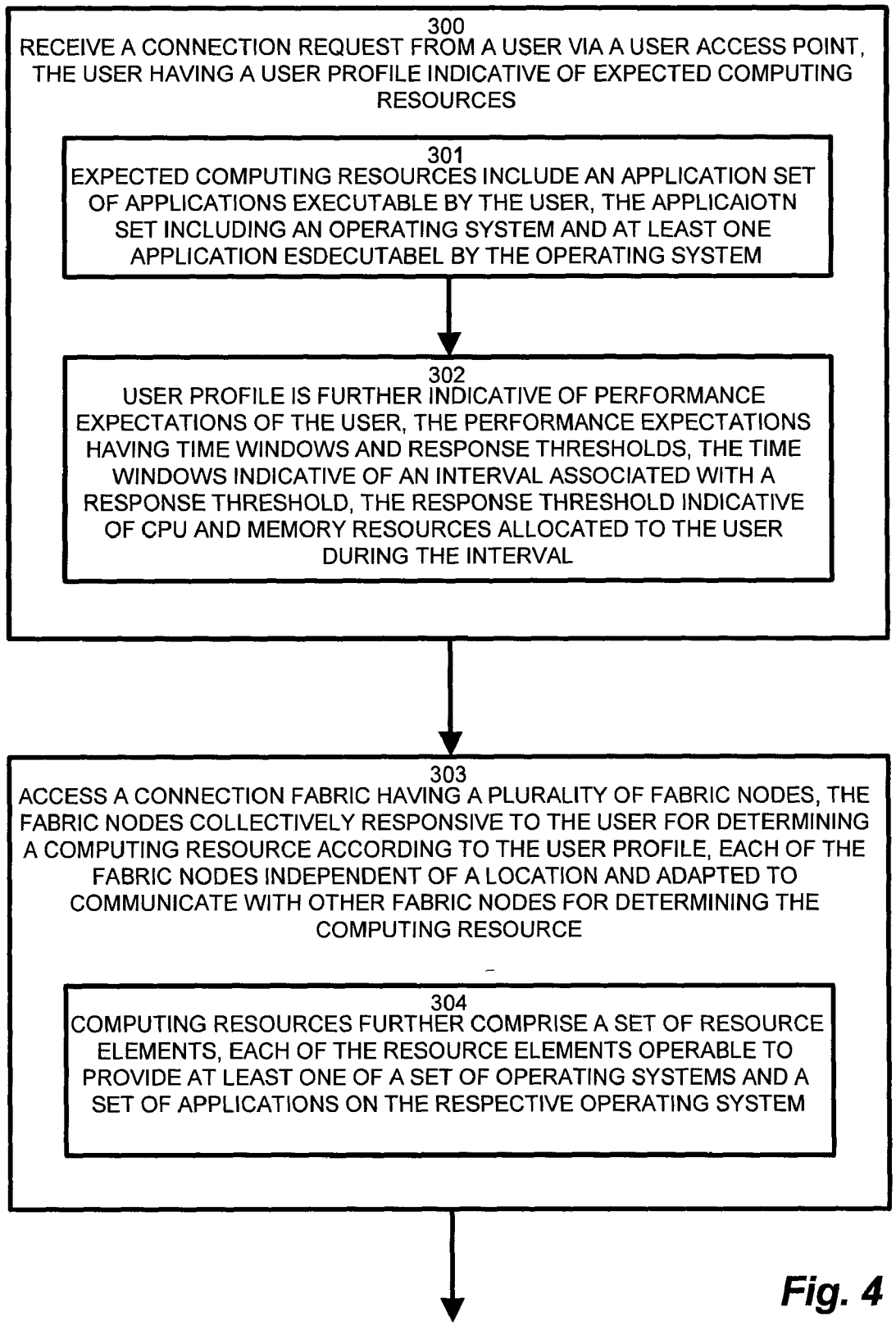
FIGS. 4-7 are a flowchart of user invocation of the connection fabric.
Figure 5:
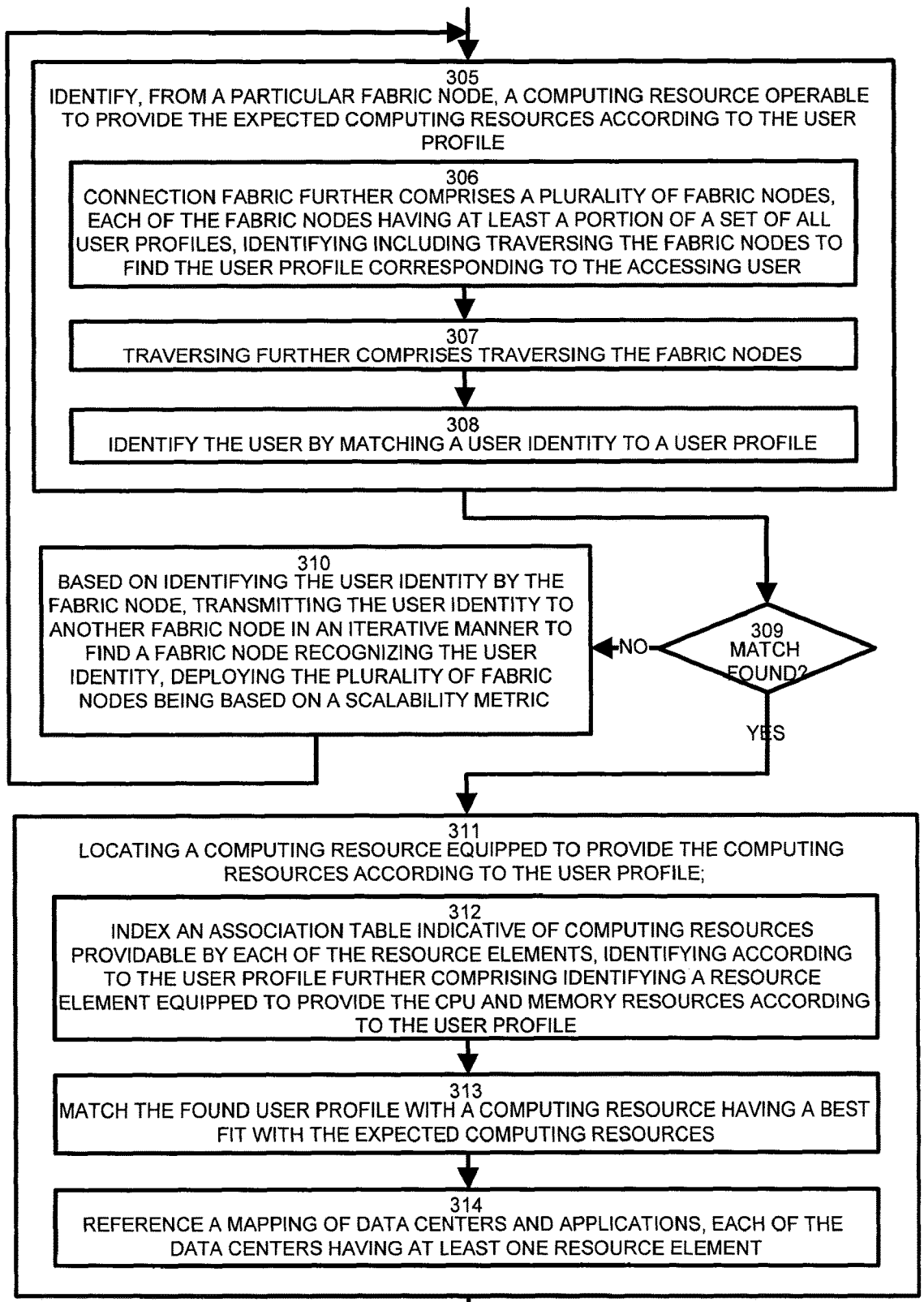
Figure 6:
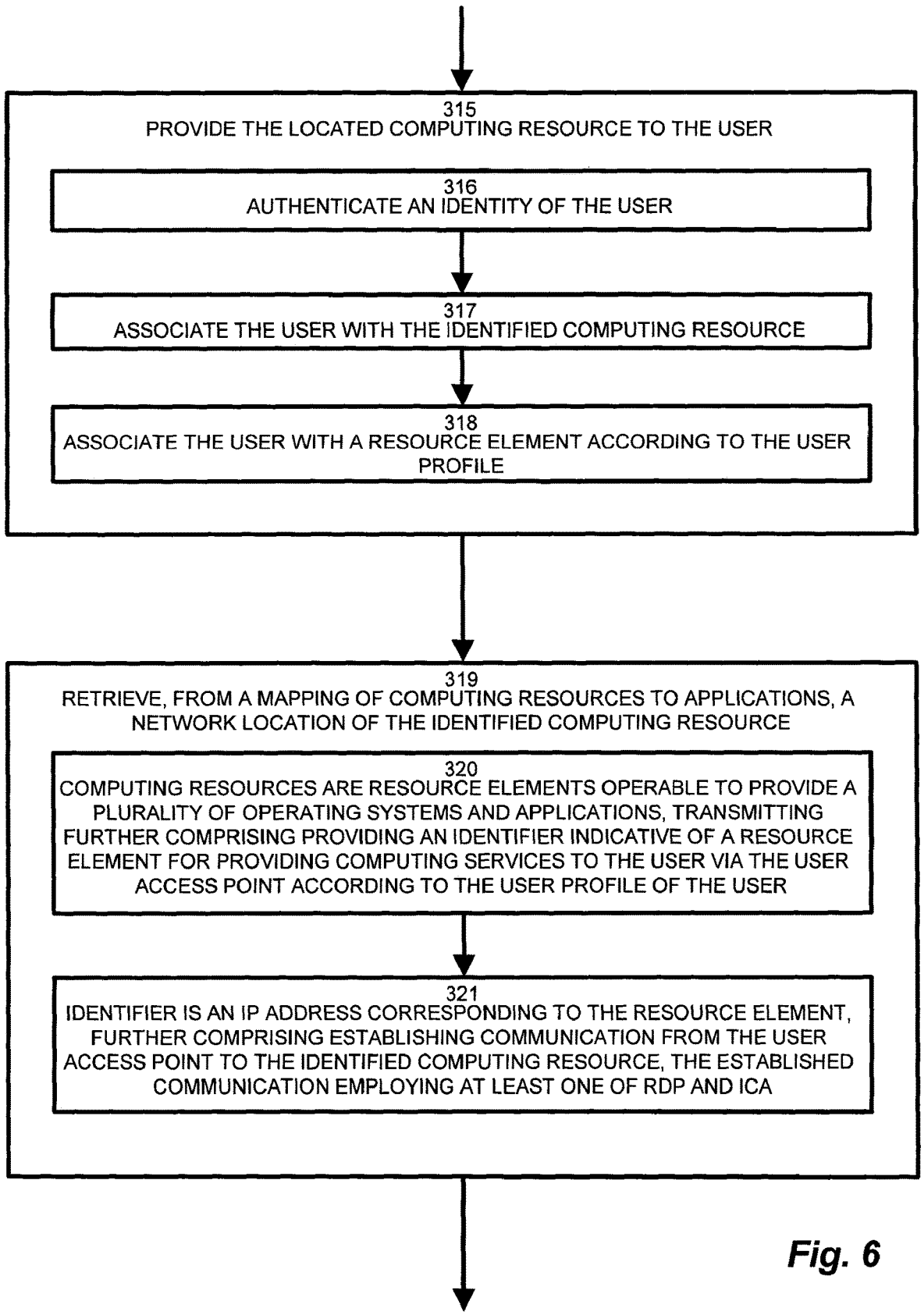
Figure 7:
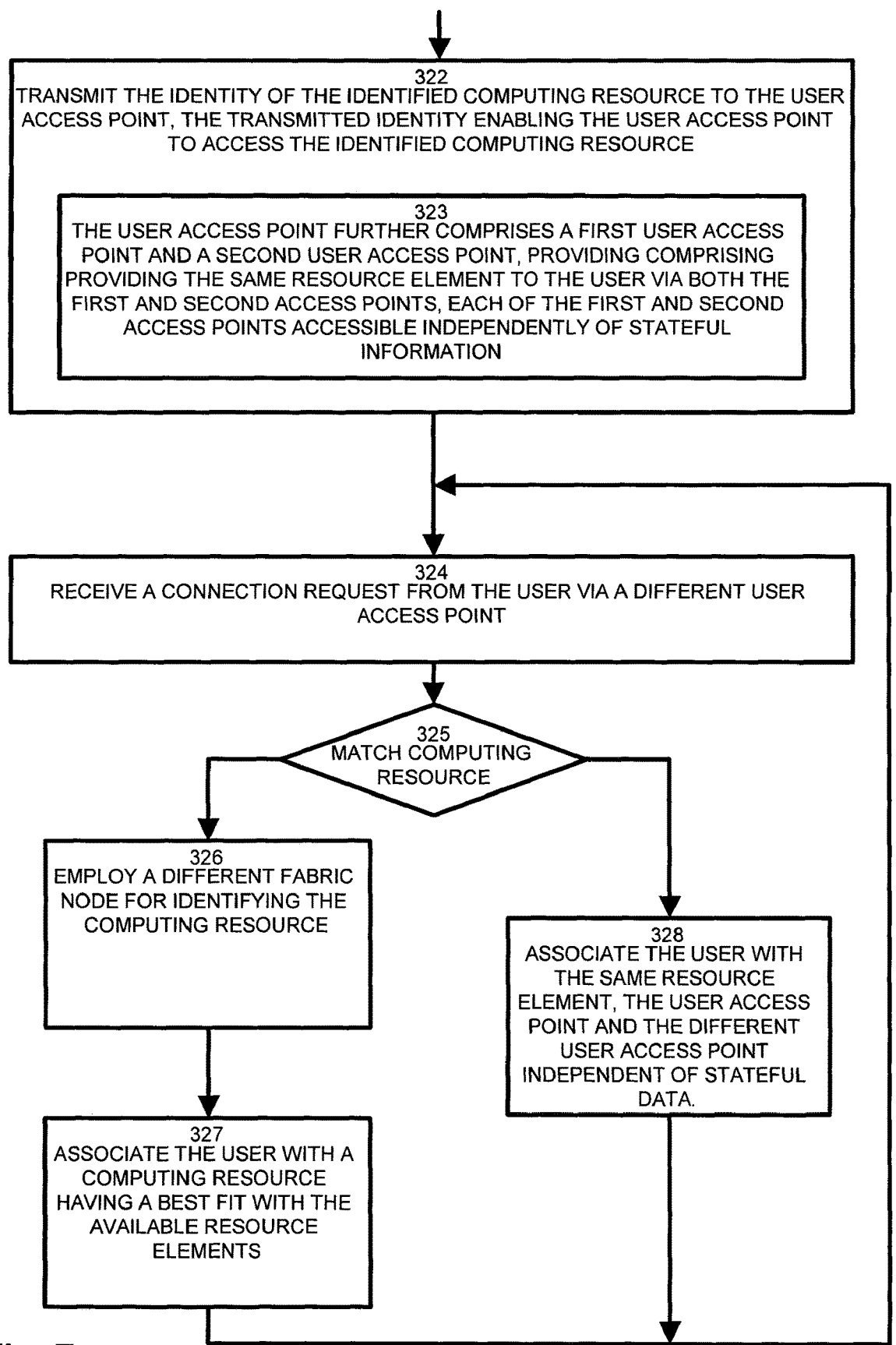

FIG. 3 is a block diagram of a connection fabric 134 configuration suitable for use with the present invention. Referring to FIGS. 1 and 3, the connection fabric includes 134 an interconnection of network devices 135-1 . . . 135-3 (135 generally) including instantiations of the fabric nodes 138. The network devices 135 may be any suitable device for instantiating the fabric nodes 138, and each may include multiple instantiations of fabric nodes 138-N depending on the capabilities of the respective device 135. The fabric nodes 138 collectively maintain a user profile table 160 (profile table) including the expected computing resources for a user 120. Each entry 162-1 . . . 162-N (162 generally) in the user profile table 160 includes user parameters 164 indicative of the expected computing resources of the user 120. The user parameters 164 include, in the example arrangement, the user identity 164-1, an IP address 164-2 of the current or most recent user device employed, an organization 164-3 to which the user belongs to enable grouping of users 120, an element 164-4 denoting the IP address of the computing resource 110 currently or most recently assigned to the user device 122, an operating system 164-5 expected by the user and corresponding set of applications 164-6, a CPU speed 164-7 expected by the user (i.e. computing "horsepower"), a memory requirement 164-8 based on the user's tasks, a response time 164-9 for prioritizing the user in a multi user (i.e. hypervisor) environment, and a cost 164-10 for evaluating the impact of delegating the user to faster or specialized resources. Other user profile parameters 164 may be employed as explained further in the copending application cited above. The fabric nodes 138 also access an association table 180 indicative of resources available at each of the computing resources 110 and having associations of users devices 122 to the computing resources 110.

To invoke the connection fabric 134 for receiving computing resources, the user 120 employs the access device 122 to issue the connection request 142. The request 140 is received by one of the instantiations of the fabric nodes 138, typically, although not necessarily the most local, (via network distance). If the receiving fabric node 138 is not able to resolve the user, another fabric node 138 is invoked to see if the identity 164-1 of the user 120 is recognized. Additional fabric nodes 138 are traversed until the user 164-1 is located.

Each of the fabric nodes 138 is operable to match the parameters 164 from the user profile entry 162 to find a "best fit" match of resource capabilities 181 with the expected computing resources of the user, taking into account factors such as network distance and overall user load in addition to the individual parameters 164 of the user 120. As indicated above, computing resources 110 include resource elements 112, such as the hypervisor element described in the copending application cited above, a dedicated server 114, or a grid service 116. Each of the computing resources 110 is disposed in a network location such as a data center 111-1 . . . 111-3 (111 generally), hosted at various locations across the computing resource grid 132. Each data center 111 may be a single computer/processor, or may include multiple machines and/or clusters operable for providing various computing services. In the example configuration discussed below, data center 111-11 includes resource elements 112-1 . . . 112-3 for providing virtual computing services via a hypervisor which matches the expected computing resources of the user 122.

An association table 180 identifies the applications 164-6 and operating systems 164-5 available on each of the computing resources 110. The user profile 162 of a requesting user 120 indicates the expected computing resources for that user 122. The expected computing resources, stored in the user profile 162 for the user 122, is matched against the association table to find an appropriate computing resource for the user 122. The identity 164-1 of the user 122 and network location (IP address) 164-2 is then associated with the computing resource 110 in the association table 180, and the network location (IP address) of the computing resource 110 provided to the user device 120.

For example, a user 120' employs user access device 122' to issue a request 142. The request 142 is received by fabric node 138-16, on network device 135-2, shown by arrow 170. Fabric node 138-16 cannot find a user identity 164-1 for user 120', so it passes the request 142 to fabric node 138-13, as shown by dotted line 171. Fabric node 138-13 finds the user profile entry 162 for user 120', and reads the corresponding parameters 164. Based on the parameters 164, the fabric node 138-13 concludes that resource element 112-2 is best suited for the users needs. Accordingly, fabric node 138-13 receives the IP address (identity) 144 of resource element 112-2, as shown by dotted line 72. The fabric node 138-1.2 associates resource element 112-2 with user 120' in the user profile table 160, and sends the user device 122' the identity (IP address) 140 of the resource element 112-2, as shown by dotted line 174. The user device 122' is now enabled to directly access resource element 112-2, as shown by dotted line 176.

The user profile table 160 is effectively a distributed database of users which provides the complete user profile table 160 via the collective fabric node 138 instantiations. User profile entries 162 are stored and managed by the fabric nodes 138 such that a reasonable number of traversals among the fabric nodes 138 yields a hit (match) on the user identity 164-1. In an example arrangement, three fabric nodes 138 at a maximum need be traversed to find a properly registered user 164-1, depending on the distribution and redundancy of individual user profile entries 162. In an example arrangement, the fabric nodes 138 may be implemented using a 3 party toolkit such as VMware, marketed commercially by VMware, Inc., of Palo Alto, Calif. Alternatively, the user profile table 160 may be managed by other mechanisms such as a distributed database or other suitable arrangement.

FIGS. 4-7 are a flowchart of user invocation of the connection fabric 134. Referring to FIGS. 3-6, at step 300, the connection fabric 134 receives a connection request 142 from a user via a user access point (access device) 122, in which the user has a user profile 162 indicative of expected computing resources. The user profile 162 is stored in a user profile table 160 or other suitable repository. In the example configuration, the user profile table 160 is distributed among the fabric nodes 138 such that a connection request 142 to any of the fabric nodes 138 triggers a search of each of the fabric nodes for the entry 162 corresponding to the user.

The expected computing resources include an application set 164-6 of applications executable by the user, in which the application set including an operating system 164-5 and at least one application 164-6 executable by the operating system 164-5, as depicted at step 301. The user profile entry 162 is further indicative of performance expectations of the user 120. The performance expectations specify time windows and response thresholds, such that the time windows are indicative of an interval associated with a response threshold indicative of CPU and memory resources allocated to the user during the interval. Other parameters 164 may also be included in the user profile entry 162.

Upon transmission of the request 142 for computing services, the request 142 accesses the connection fabric 134 having a plurality of fabric nodes 138, such that the fabric nodes are collectively responsive to the user device 122 for determining a computing resource 110 according to the user profile entry (user profile) 162. In the example configuration shown, each of the fabric nodes 138 is independent of a location and is adapted to communicate with other fabric nodes 138 for determining the computing resource, thus allowing the instantiation of additional fabric nodes to maintain timely traversal and servicing of the user request 142, as described at step 303.

The computing resources 110 that are determinable by the fabric nodes further define a set of resource elements 112, such that each of the resource elements is operable to provide operating systems and a set of applications 164-4 on the respective operating system 164-5, as disclosed at step 304. The resource elements 112 include a hypervisor for providing a plurality of operating systems to respective users and executing applications 164-6 corresponding to, or on behalf of, each user in the user's 120 respective address space in the resource element 112.

Upon receiving the request 142, the connection fabric 134 identifies, from a particular fabric node 138, the computing resource 110 operable to provide the expected computing resources according to the user profile 162, as depicted at step 305. As discussed above, the connection fabric 134 includes a plurality of fabric nodes 138, such that each of the fabric nodes 138 has a distributed portion of a set of all user profiles 162-N. Identifying the particular user 120 therefore includes traversing the fabric nodes 138 to find the user profile 162-N corresponding to the accessing user 120, as disclosed at step 306. In the example arrangement, traversing further comprises traversing the fabric nodes, as shown at step 307 such that each fabric node traversed attempts to identify the user 120 by matching a user identity 164-1 to a user profile 162-N, as depicted at step 308. If a match to the user ID is not found by a particular fabric node 138, as shown by the check at step 309, then the fabric node 138 transmits the user identity 164-1 to another fabric node 138-N in an iterative manner to find a fabric node 138 recognizing the user identity 164-1, and thus retrieving the corresponding user profile entry 162-N, as shown at step 310. Deployment of the plurality of fabric nodes 138 is therefore based on a scalability metric cognizant of the number of users 120 and distribution of the network devices 135 supporting the fabric nodes 138.

If a match is found at step 309, then the fabric node 138 locates a computing resource 110 equipped to provide the computing resources according to the user profile 162, as shown at step 311. This includes indexing an association table 180 indicative of computing resources 181 providable by each of the resource elements 110, as disclosed at step 312. The fabric node 138 identifies a computing resource 110 according to the user profile 162, as depicted at step 312. The computing resources 110 include resource elements 112 having a hypervisor, dedicated servers 114, and grid computing resources 116, each equipped in varying degrees to provide the CPU and memory resources according to the user profile 162. The selected computing resource 110 depends on matching the found user profile 162 with the computing resource 110 having a best fit with the expected computing resources from the user profile 162, as shown at step 313. Each of the computing resources 110 is physically executed at a data center 111 or other suitable hardware installation, and thus matching the computing resources for the user 120 includes referencing the association table 180 to scan the mapping of data centers 111 and applications 164-6, such that each of the data centers 111 has at least one of resource elements 112, dedicated servers 114, and grid computing resources 116, as depicted at step 314.

From the association table 180, the fabric node 138 retrieves the identity of the computing resource 110 for providing the located computing resource 110 to the user 120, as depicted at step 315. This includes authenticating an identity of the user 120 via the user device 122, as shown at step 316, and associating the user 120 with the identified computing resource 110, as depicted at step 317. In the example arrangement, this involves associating the user 120 with the resource element 110 according to the user profile, and storing the association in the association table 180, as shown at step 318.

The association of users 120 to computing resources 110 occurs by retrieving, from a mapping of computing resources to applications (stored in the association table 180), a network location 144 of the identified computing resource 110, as depicted at step 319. In the example arrangement, the computing resources 110 are resource elements 112 operable to provide a plurality of operating systems 164-5 and applications 164-6, such that transmitting further comprises providing an identifier 144 indicative of the resource element 110 for providing computing services to the user via the user access device 122 and according to the user profile 162 of the user 120, as depicted at step 320. In the example arrangement, the identifier 144 is an IP address corresponding to the resource element 110, and is employed for establishing communication from the user access device 122 to the identified computing resource 110, such that the established communication employs either RDP or ICA, as are known to one of skill in the art, depicted at step 321. Alternatively, other addressing schemes (such as MAC addresses, URLs, or DNS) and alternate communication may be employed to establish a connection between the user device 122 and computing resource 110, as shown by arrow 176.

Connections may be established using RDP. ICA, or any suitable protocol or medium. In particular, RDP's popularity is that an RDP server is built into the XP Pro operating system. When a remote device connects to XP running in a VM, the remoting protocol is coming from the XP guest operating system. RDP support in thin clients dates back to Microsoft® Terminal Services. Recently, a number of vendors have layered additional features (including multimedia acceleration) on top of RDP by taking advantage of RDP's virtual channel support.

ICA is Citrix's proprietary remoting protocol. Historically, ICA provided a preferable user experience, particularly over high latency and low bandwidth links. Development of the ICA protocol has continued and ICA has maintained distinctive features in contrast to RDP.

To complete the establishment of virtual computing services to the user 122 via the connection fabric 134, the fabric node 138 transmits the identity 140 of the identified computing resource 110 to the user access device 122, such that the transmitted identity enables the user access device 120 to access the identified computing resource 110 directly via an IP connection 176 or other medium, as depicted at step 322.

In the example configuration, successive logins from different locations are performed such that the user access point (device) 122 further defines a first user access point and a second user access point. The connection fabric 134 provides the same resource element 112 to the user 122 via both the first and second access points 122, 122', such that each of the first and second access points is accessible independently of stateful information, as disclosed at step 323. Each of the access points 122 are provided by a low-cost interactive device requiring only a screen and keyboard for I/O exchange. All computing is performed by the computing resource via the I/O exchanges. Therefore, the access point devices 122 do not require any stateful information because the actual processing is performed by the computing resource 110.

During ongoing operation of the connection fabric 134, as shown at step 324, the connection fabric 134 receives a connection request 142 from the user 120 via a different user access point 122. The connection fabric 134 again matches the user profile 162 to a computing resource 110, as depicted at step 325. Depending on the network location of the access point 122, the connection node 138 may employ a different fabric node 138 for identifying the computing resource 110, as depicted at step 326. The fabric node 138 associates the user 122 with a computing resource 110 having a best fit with the available resource elements 112 or other (114, 116) resources. Alternatively, the connection fabric 134 and included fabric nodes 138 may associate the user with the same resource element 112, in which the user access point 122 and the different user access point 122' are still both independent of stateful data as described above. Access to the computing resources 110 is thus provided independently of the network location of the user access device 122, and is matched by the connection fabric 134 utilizing the collective set of fabric nodes 138.

Those skilled in the art should readily appreciate that the programs and methods for provisioning via a connection fabric as defined herein are deliverable to a user processing and rendering device in many forms, including but not limited to a) information permanently stored on non-writeable storage media such as ROM devices, b) information alterably stored on writeable storage media such as floppy disks, magnetic tapes. CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for provisioning via a connection fabric has been particularly shown and described with references to embodiments thereof, it will be understood by those skilled in the art that various changes in form and details may be made therein without departing from the scope of the invention encompassed by the appended claims.

What is claimed is:

1. A method of deploying computing resources using a connection fabric having a plurality of fabric nodes, comprising:

receiving, at the connection fabric and from a user access point, a connection request for a computing resource, wherein a user of the user access point is associated with a profile indicating resource parameters for a virtual desktop;

identifying, by the connection fabric, the profile associated with the user, wherein one or more of the plurality of fabric nodes form part of a distributed data repository, and wherein the profile is stored in at least one of the plurality of fabric nodes of the connection fabric;

accessing the profile and using the resource parameters of the virtual desktop defined by the profile to identify the computing resource that satisfies the resource parameters of the profile; and providing an identity of the identified computing resource to the user access point, wherein the identity of the identified computing resource enables the user access point to access the identified computing resource that provides the virtual desktop, wherein the connection fabric scales independently and separately from any computing resources that provide virtual desktops, and scaling the connection fabric includes instantiating one or more additional fabric nodes to the connection fabric.

2. The method of claim 1, further comprising:

retrieving, from a mapping of computing resources to applications, a network location of the identified computing resource, wherein the mapping is located on a fabric node of the plurality of fabric nodes of the connection fabric, and wherein the mapping identifies applications and operating systems available on each of a plurality of computing resources.

3. The method of claim 1, wherein identifying the computer resource comprises matching the resource parameters of the profile to particular applications and operating systems available on each of a plurality of available computing resources.

4. The method of claim 3, further comprising:

associating the user with the identified computing resource including designating the match in a repository for future reference.

5. The method of claim 1, wherein identifying the profile comprises:

determining whether the profile associated with the user is found on a first fabric node of the plurality of fabric nodes of the connection fabric; and in response to a determination that the profile associated with the user is not found on the first fabric node, iteratively traversing one or more second fabric nodes of the plurality of fabric nodes of the connection fabric until the profile is found.

6. The method of claim 1, wherein the plurality of fabric nodes are collectively responsive to the user access point for determining the computing resource according to the profile.

7. The method of claim 1, wherein a plurality of profiles is distributed among the plurality of fabric nodes, wherein each fabric node stores a subset of the plurality of the profiles, and wherein the number of traversals among the fabric nodes that yields a match to identify the profile associated with the user is no more than a predetermined number.

8. A system comprising:

one or more processors; and at least one memory, the one or more processors and the at least one memory configured to:

receive, at a connection fabric having a plurality of fabric nodes and from a user access point, a connection request for a computing resource, wherein a user of the user access point is associated with a profile indicating resource parameters for a virtual desktop;

identify, by the connection fabric, the profile associated with the user, wherein one or more of the plurality of fabric nodes form part of a distributed data repository, and wherein the profile is stored in at least one of the plurality of fabric nodes of the connection fabric;

access the profile and using the resource parameters of the virtual desktop defined by the profile to identify the computing resource that satisfies the resource parameters of the profile; and provide an identity of the identified computing resource to the user access point, wherein the identity of the identified computing resource enables the user access point to access the identified computing resource that provides the virtual desktop, wherein the connection fabric scales independently and separately from any computing resources that provide virtual desktops, and scaling the connection fabric includes instantiating one or more additional fabric nodes to the connection fabric.

9. The system of claim 8, wherein the one or more processors and the at least one memory are further configured to:

retrieve, from a mapping of computing resources to applications, a network location of the identified computing resource, wherein the mapping is located on a fabric node of the plurality of fabric nodes of the connection fabric, and wherein the mapping identifies applications and operating systems available on each of a plurality of computing resources.

10. The system of claim 8, wherein to identify the computer resource comprises to match the resource parameters of the profile to particular applications and operating systems available on each of a plurality of computing resources.

11. The system of claim 10, wherein the one or more processors and the at least one memory are further configured to:

associate the user with the identified computing resource including designating the match in a repository for future reference.

12. The system of claim 8, wherein to identify the profile comprises to:

determine whether the profile associated with the user is found on a first fabric node of the plurality of fabric nodes of the connection fabric, and in response to a determination that the profile associated with the user is not found on the first fabric node, iteratively traverse one or more second fabric nodes of the plurality of fabric nodes of the connection fabric until the profile is found.

13. The system of claim 8, wherein the plurality of fabric nodes are collectively responsive to the user access point for determining the computing resource according to the profile.

14. The system of claim 8, wherein a plurality of profiles is distributed among the plurality of fabric nodes, wherein each fabric node stores a subset of the plurality of the profiles, and wherein the number of traversals among the fabric nodes that yields a match to identify the profile associated with the user is no more than a predetermined number.

15. A non-transitory computer-readable medium comprising instructions that, when executed by one or more processors of a computing system, cause the computing system to perform operations comprising:

receiving, at a connection fabric having a plurality of fabric nodes and from a user access point, a connection request for a computing resource, wherein a user of the user access point is associated with a profile indicating resource parameters for a virtual desktop;

identifying, by the connection fabric, the profile associated with the user, wherein one or more of the plurality of fabric nodes form part of a distributed data repository, and wherein the profile is stored in at least one of the plurality of fabric nodes of the connection fabric;

accessing the profile and using the resource parameters of the virtual desktop defined by the profile to identify the computing resource that satisfies the resource parameters of the profile;

providing an identity of the identified computing resource to the user access point, wherein the identity of the identified computing resource enables the user access point to access the identified computing resource that provides the virtual desktop, wherein the connection fabric scales independently and separately from any computing resources that provide virtual desktops, and scaling the connection fabric includes instantiating one or more additional fabric nodes to the connection fabric.

16. The non-transitory computer-readable medium of claim 15, wherein the operations further comprise:

retrieving, from a mapping of computing resources to applications, a network location of the identified computing resource, wherein the mapping is located on a fabric node of the plurality of fabric nodes of the connection fabric, and wherein the mapping identifies applications and operating systems available on each of a plurality of computing resources.

17. The non-transitory computer-readable medium of claim 15, wherein identifying the computer resource comprises matching the resource parameters of the profile to particular applications and operating systems available on each of a plurality of computing resources.

18. The non-transitory computer-readable medium of claim 17, wherein the operations further comprise:

associating the user with the identified computing resource including designating the match in a repository for future reference.

19. The non-transitory computer-readable medium of claim 15, wherein identifying the profile comprises:

determining whether the profile associated with the user is found on a first fabric node of the plurality of fabric nodes of the connection fabric, and in response to a determination that the profile associated with the user is not found on the first fabric node, iteratively traversing one or more second fabric nodes of the plurality of fabric nodes of the connection fabric until the profile is found.

20. The non-transitory computer-readable medium of claim 15, wherein the plurality of fabric nodes are collectively responsive to the user access point for determining the computing resource according to the profile.

21. The non-transitory computer-readable medium of claim 15, wherein a plurality of profiles is distributed among the plurality of fabric nodes, wherein each fabric node stores a subset of the plurality of the profiles, and wherein the number of traversals among the fabric nodes that yields a match to identify the profile associated with the user is no more than a predetermined number.

* * * * *